Nov. 15, 1955        J. J. LENTZ        2,724,113
ANTENNA SCANNING CONTROL APPARATUS
Filed Sept. 14, 1945
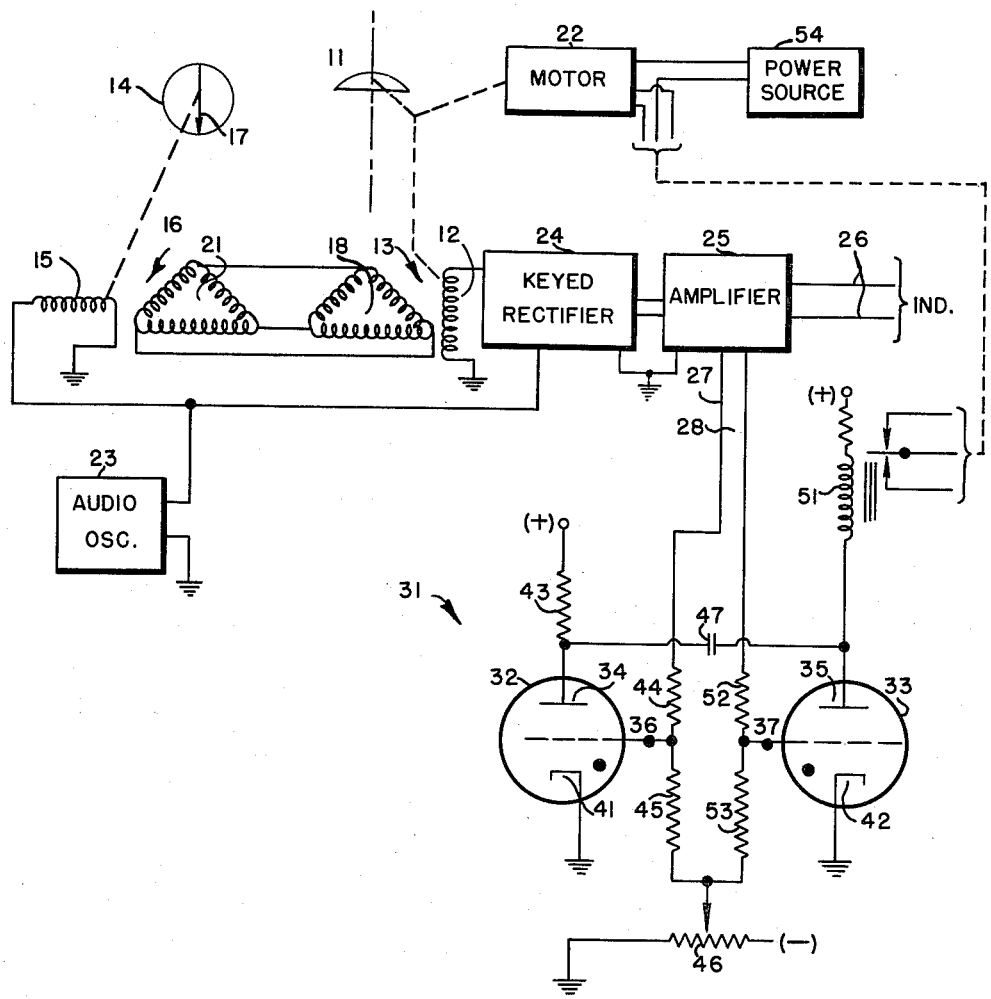
INVENTOR.
JOHN J. LENTZ
BY
William D. Hall
ATTORNEY

United States Patent Office 2,724,113
Patented Nov. 15, 1955

2,724,113

ANTENNA SCANNING CONTROL APPARATUS

John J. Lentz, Cambridge, Mass., assignor, by mesne assignments, to the United States of America as represented by the Secretary of War Application September 14, 1945, Serial No. 616,379

7 Claims. (Cl. 343—100)

This invention relates to scanning or rotating highly directional antennas such as the type known in the art as parabolas, and more particularly to apparatus for causing such an antenna to scan a sector of a predetermined size about a reference direction.

In certain applications of radio object-locating systems, such as bombing, it is sometimes desirable to cause the antenna of the system to scan a sector of specified size, as for example, 30 degrees instead of a complete 360-degree scan. It is also desirable to be able to choose the direction about which the antenna scans, i. e., the center line of the sector, and to further provide for stabilization of the sector scanned regardless of movement of the aircraft, ship, or other carrier on which the antenna is mounted.

It is an object of the present invention therefore to provide an apparatus which will control the stabilized movement of an antenna in a sector of predetermined size about any desired reference direction.

For a better understanding of the invention together with other and further objects thereof, reference is had to the following description taken in connection with the accompanying drawing which shows in block and diagrammatic form the preferred embodiment of the present invention.

Referring now to the drawing, an antenna 11 is mechanically connected to a rotor 12 of a self-synchronous receiver 13. The self-synchronous receiver 13 may be any of several types well known in the art and manufactured under trade names such as "Selsyn," "Synchrotie," and "Autosyn." A stabilizer 14 is mechanically connected to a rotor 15 of a self-synchronous generator 16. The stabilizer 14 may be any device capable of causing the rotor 15 to remain in a predetermined fixed position relative to a specified axis of the earth. The stabilizer 14 preferably comprises a gyroscope, one axis of which is maintained fixed relative to a specified axis of the earth, and electrical or mechanical means for establishing a reference direction, such as indicated by arrow 17, which is stabilized by the gyroscope but the position of which may be moved as desired. Stator windings 18 and 21 of the self-synchronous receiver and transmitter 13 and 16 respectively are connected in parallel in a manner well known in the art. A motor 22 is mechanically connected to the antenna 11 and is adapted to rotate the antenna 11 at a constant angular velocity in azimuth. An audio oscillator 23 having a frequency of oscillation preferably in the neighborhood of 3000 to 5000 cycles per second is connected to the winding of the rotor 15 of self-synchronous generator 16 and also to a rectifier 24. The winding of rotor 12 of self-synchronous receiver 13 is also connected to the rectifier 24. The rectifier 24 may be any device capable of producing a D.-C. output voltage which is proportional to the modulation envelope of the input signal. In the preferred embodiment the rectifier 24 is similar to the keyed rectifier disclosed and claimed in the co-pending application by Chalmers W. Sherwin, Serial No. 518,777, filed January 18, 1944, now Patent Number 2,389,692. It will become more apparent from the discussion to follow that this rectifier 24 must be capable of detection without phase distortion; otherwise, an unnecessary broadening of the target indication on the indicator tube of the radio object-locating system will occur.

The output of the rectifier 24 is fed to an amplifier 25 which is preferably of the push-pull type. Output leads 26 from the amplifier 25 go to the indicator of the radio object-locating system to provide azimuth sweep voltages. A second output on leads 27 and 28 goes to a thyratron control circuit represented generally by 31. The thyratron control circuit 31 comprises gas tubes 32 and 33 having plate elements 34 and 35 respectively, grid elements 36 and 37 respectively, and cathode elements 41 and 42 respectively. The plate 34 of tube 32 is connected through a resistor 43 to a suitable source of positive potential. The cathode 41 of tube 32 is connected to ground. The grid 36 of tube 32 is connected through an isolating resistor 44 to output lead 27 of amplifier 25. The grid 36 of tube 32 is also connected through an isolating resistor 45 to a tap on a potentiometer 46. One end of the potentiometer 46 is connected to ground and the other end is connected to a suitable source of negative potential. The plate 34 of tube 32 is connected to plate 35 of tube 33 by a coupling capacitor 47. The plate 35 is connected through the coil of a relay 51 to a suitable source of positive potential. The contacts of relay 51 are arranged to provide a single-pole double-throw switch with no neutral position. The cathode 42 of tube 33 is connected to ground and the grid 37 of tube 33 is connected through an isolating resistor 52 to the output lead 28 of amplifier 25 and also through an isolating resistor 53 to the aforementioned tap on the potentiometer 46. A suitable power source 54 has one lead connected directly to the motor 22 and a second lead connected to the central terminal of the contacts on relay 51. The remaining two contacts on relay 51 are connected to the motor 22 in such a manner that the motor 22 will turn the antenna 11 in one direction when the relay 51 is energized and turn the antenna 11 in the opposite direction when the relay 51 is deenergized.

As has been before stated one object of the present invention is to cause the antenna 11 to scan a sector centered about a reference direction. It is well known in the art that when the rotor of one of two self-synchronous transmitter and receiver devices whose stator windings are connected in parallel is energized from a source of alternating voltage, there will be no voltage induced in the rotor winding of the other self-synchronous device if the rotors are physically displaced by 90 degrees. Furthermore, it is well known that the amplitude of the voltage induced in the rotor winding of the second self-synchronous device is a sine function of the angular displacement from this zero voltage position. The antenna 11 and the stabilizer 14 are so connected to the rotors 12 and 15 that when the antenna 11 is pointing in the same direction as the arrow 17 the voltage induced in the winding of rotor 12 is zero. As the motor 22 rotates the antenna 11 away from this position of zero voltage the amplitude of the voltage induced in the winding of rotor 12 will increase in a sinusoidal manner with time assuming the antenna 11 is rotated with constant angular velocity. The output of the rectifier 24 will be a unidirectional voltage representing the modulation envelope of the input signal. It will be seen that this voltage will be approximately a sinusoidal voltage varying at the angular speed of the antenna 11. This voltage is amplified by amplifier 25 and applied to the indicator of the radio object locating system to provide azimuth sweep as before indicated. This voltage is also applied through leads 27 and 28 to the grids 36 and 37 of tubes 32 and 33. Let us assume that the antenna 11 is being moved in such a direction that the voltage on lead 28 is rising and that the voltage on lead 27 is decreasing. There will also be assumed that the relay is deenergized and that the tube 33 is not conducting. When the voltage on lead 28 has risen sufficiently high to overcome the D.-C. bias on the grid 37 of tube 33 as set by the tap on potentiometer 46, the tube 33 will be rendered conducting. This will energize the relay 51 and cause the contacts thereof to move in such a manner as to reverse the direction of the motor 22 and antenna 11. As a result the voltage induced in the winding of rotor 12 will begin to decrease as will the voltage on lead 28 and grid 37. At the same time the voltage on lead 27 will begin to rise. It is well known in the art that once a gas triode is in a conducting state the grid element has little effect on its state of conduction. When the antenna 11 has been rotated back to its initial position wherein no voltage is induced in the winding of rotor 12, the voltage on leads 27 and 28 will be substantially equal. As the antenna 11 continues in the same direction, the voltage induced in the winding of rotor 12 will again increase sinusoidally, but will have a phase which is 180 degrees different from that induced in the first instance. The action of the keyed rectifier 24 is such that the output voltage will be reduced from an average value by an amount which represents the modulation envelope of the induced voltage in the winding of rotor 12. This voltage when applied through the amplifier 25 will move the azimuth sweep in the proper direction and will cause the voltage on output lead 27 to rise. When this voltage overcomes the bias on grid 36 of tube 31 as set by potentiometer 46, tube 32 will be rendered conducting. When tube 32 conducts the plate 34 will drop in potential. This drop in potential will be coupled through the capacitor 47 to the plate 35 of tube 33. The drop in potential of the plate 35 will be sufficient to render the tube 33 non-conducting with subsequent deenergization of relay 51 and reversal of motor 22 and antenna 11.

It will be seen that since the amplitude of the voltage on leads 27 and 28 is dependent upon angular position of the antenna relative to the stabilized reference direction and since the time of conduction of tubes 32 or 33 depends upon the voltage on leads 27 or 28 overcoming the bias on tubes 32 or 33 that the angular size of the sector which is scanned may be readily adjusted by adjusting the setting of potentiometer 46.

It will also be noted that, since the antenna 11 rotates about a direction which produces zero voltage in the rotor 12 of the synchro receiver 13 and since the angular position of antenna 11 which provides zero voltage is determined by the position of rotor 15 which in turn is determined by the position of the reference direction 17, moving the azimuthal position of the reference direction 17 will change the direction about which the antenna 11 scans.

While there has been described what is at present considered to be the preferred embodiment of the present invention, it will be obvious to those skilled in the art that various changes and modifications may be made therein without departing from the scope of the invention as set forth in the appended claims.

What is claimed is:

1. In an antenna scanning apparatus comprising an antenna mechanically coupled to an electric motor, and having a self-synchronous transmitter comprising a first rotor and a first stator, and a self-synchronous receiver comprising a second rotor and a second stator, the said stators of said transmitter and receiver being connected in parallel, the combination comprising: stabilizing means mechanically coupled to said first rotor for maintaining said rotor in a predetermined fixed position relative to a specified axis; means mechanically coupling said antenna to said second rotor whereby the position of said second rotor corresponds to the position of said antenna; means energizing said first rotor with an alternating voltage, whereby the magnitude and phase of the alternating voltage induced across said second rotor will vary as a function of the position of said second rotor relative to said first rotor; a source of energy for said motor; magnetic motor reversing means connected between said motor and said source; and means for periodically energizing said magnetic motor reversing means comprising rectifier means electrically coupled to said second rotor for producing a direct voltage, the magnitude of which is proportional to the envelope of the alternating voltage induced in said second rotor, and the polarity of which is a function of the phase of said induced voltage, a pair of gas discharge triodes each having a plate, a cathode and a control grid, means coupling said plates through a condenser, means connecting one of said triodes in series with the said magnetic motor reversing means; means adjustably biasing the control grids of said troides below the point of conduction, means for applying said direct voltage in opposite polarity to each of said control grids; whereby one of said triodes will conduct when the said direct voltage overcomes the bias on one of said triodes, thereby energizing or deenergizing said magnetic motor reversing means to reverse the direction of rotation of said motor.

2. In an antenna scanning apparatus comprising an antenna mechanically coupled to a reversible motor, and means for oscillating said antenna about a given reference between predetermined limits, comprising: means for producing an alternating voltage, the amplitude and phase of which vary as a function of antenna position with respect to said reference; rectifying means for said alternating voltage for producing a direct voltage which is the envelope of said alternating voltage; reversing means for said motor normally biased for rotation of said motor in one direction; means for energizing said reversing means to reverse the direction of rotation of said motor at predetermined limits comprising a switch adjustably biased to an open position and connected in series with said reversing means; and means for applying said direct voltage to said switch to overcome said bias, whereby said switch will close and said reversing means will be energized to reverse said motor.

3. The combination as defined in claim 2 wherein said switch is an electron switch.

4. The combination as defined in claim 3 wherein said electron switch comprises a pair of gas discharge devices each having a plate, a cathode and a grid; a capacitor coupling said plates; said reversing means being connected in series with the plate circuit of one of said devices; means adjustably biasing the grids of said devices to a predetermined point below conduction; and means coupling said direct voltage to each of said grids in opposite polarity, respectively.

5. The combination as defined in claim 4 wherein said means for producing an alternating voltage, the amplitude and phase of which varies as a function of antenna position with respect to said reference comprises: a self-synchronous transmitter having a first rotor connected to a source of alternating voltage and a first stator, and a self-synchronous receiver having a second stator connected in parallel with said first stator, and a second rotor; and wherein said antenna is mechanically coupled to said second rotor.

6. The invention as defined in claim 5 wherein means are provided for maintaining the said first rotor in a predetermined fixed position relative to a given axis.

7. The combination as defined in claim 2 wherein said means for producing an alternating voltage, the amplitude and phase of which varies as a function of antenna position with respect to said reference comprises: a self-synchronous transmitter having a first rotor connected to a source of alternating voltage and a first stator, and a self-synchronous receiver having a second stator connected in parallel with said first stator, and a second rotor; and wherein said antenna is mechanically coupled to said second rotor.

References Cited in the file of this patent

UNITED STATES PATENTS

| | | |
|---|---|---|
| 2,356,922 | Eltgrath | Aug. 29, 1944 |
| 2,361,956 | Moseley | Nov. 7, 1944 |
| 2,384,004 | Bechberger et al. | Sept. 4, 1945 |
| 2,399,426 | Bradley | Apr. 30, 1946 |
| 2,412,612 | Godet | Dec. 17, 1946 |
| 2,415,679 | Edwards et al. | Feb. 11, 1947 |
| 2,415,680 | Hoyt | Feb. 11, 1947 |
| 2,416,562 | Alexanderson | Feb. 25, 1947 |
| 2,475,457 | Nygaard | July 5, 1949 |
| 2,478,740 | Bollman | Aug. 9, 1949 |
| 2,503,046 | Hills | Apr. 4, 1950 |